United States Patent [19]

Jones, Jr.

[11] Patent Number: 4,489,415
[45] Date of Patent: Dec. 18, 1984

[54] PULSE PUMPING AN OPTICALLY PUMPED LASER
[75] Inventor: William B. Jones, Jr., Scotia, N.Y.
[73] Assignee: General Electric Company, Schenectady, N.Y.
[21] Appl. No.: 397,374
[22] Filed: Jul. 12, 1982
[51] Int. Cl.³ .............................................. H01S 3/092
[52] U.S. Cl. .................................. 372/38; 315/209 R; 372/70
[58] Field of Search .................... 372/38, 70; 307/315; 315/209 R

[56] References Cited
U.S. PATENT DOCUMENTS
4,224,535  9/1980  Wilson et al. ........................ 307/270
4,276,497  6/1981  Burbeck et al. ....................... 372/70

FOREIGN PATENT DOCUMENTS
0005595 11/1979 European Pat. Off. .............. 372/38

Primary Examiner—James W. Davie
Attorney, Agent, or Firm—Donald R. Campbell; James C. Davis, Jr.; Paul R. Webb, II

[57] ABSTRACT

An efficient power supply employs a high current switching transistor to pulse a flashlamp for optical pumping in lasers, such as an Nd:YAG laser at high pulse repetition frequencies. The pulsing circuit offers a simple, flexible, and precise means of pump pulse control. Flashlamp simmer current is provided from the constant dc voltage source with a resistor in parallel with the switching transistor.

5 Claims, 1 Drawing Figure

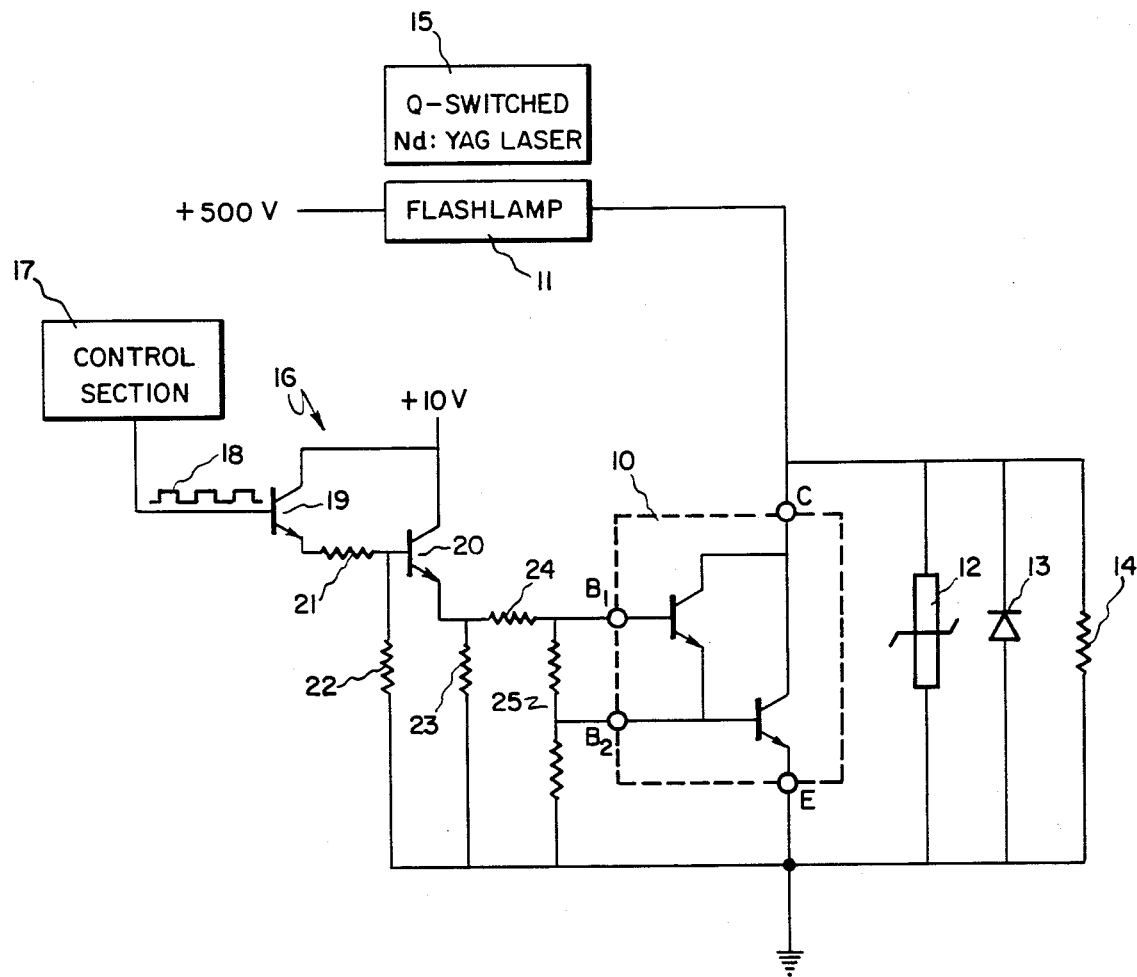

PULSE PUMPING AN OPTICALLY PUMPED LASER

BACKGROUND OF THE INVENTION

This invention relates to lasers and to an improved circuit and method for pulsing a pump lamp.

Flashlamps are commonly used to provide an optical pumping means for Q-switched Nd:YAG and other lasers. The conventional method of pulsing flashlamps is by discharging a pulse forming network in the interval between flashlamp pulses. A pulse forming network is comprised of capacitors to store electrical energy and inductances to limit the discharge current into the flashlamp load. At high repetition rates, this requires large circulating currents in the pulse forming network which leads to inefficiency. The power supply for charging the pulse forming network must be essentially a constant current supply, and this involves large circulating currents, and thus inefficiency, if the primary power source is a standard constant voltage source. Further, the flashlamp current pulse length can be controlled only by changing the component values in the pulse formimng network.

SUMMARY OF THE INVENTION

An efficient method of pulse pumping an optically pumped laser is realized by using a high current switching transistor to control the current in a flashlamp from a dc voltage power supply. The repetition frequency and length of the conducting intervals of the switching transistor are controlled, and thus the current in the flashlamp and consequently the laser pump pulses.

The improved pulsing circuit according to an illustrative embodiment is comprised of a high current Darlington transistor (a 200 ampere device) in series with a gaseous discharge lamp, the combination connected across a source of constant dc voltage (500 volts). The transistor control circuit generates adjustable pulse length and repetition frequency base drive pulses which render the transistor conductive to pulse the flashlamp; this provides the desired modulation flexibility. Preferably, current is injected into the bases of both transistors of the Darlington device. A resistor in parallel with the switching transistor provides a path for stand-by discharge current or simmer current between pulses. While the flashlamp itself is a standard device, it is filled with a mixture of krypton and xenon gases at 2 atmospheres pressure, a higher than normal pressure. A Q-switched high average power laser is optical pumped at repetition frequencies of 300–1000 pulses per second. For an application such as welding the pulse length is easily controlled to obtain precisely the required laser energy.

BRIEF DESCRIPTION OF THE DRAWING

The sole FIGURE is a simplied schematic diagram of a transistor circuit for pulsing a flashlamp which pumps a laser.

DETAILED DESCRIPTION OF THE INVENTION

An efficient power supply has been devised to pulse gas-filled flashlamps at 300 to 1000 pulses per second at pulse currents up to 200 amperes and pulse durations in the range 150 to 350 microseconds. The circuit is especially for high pulse repetition frequency, Q-switched laser amplications, but in addition the circuit offers a simple, flexible, and precise means of pump pulse control, so that, for a laser operating in the long pulse mode, the laser output pulse length can be controlled conveniently over a wide range, from microseconds to dc.

The basic approach is that of using a switching transistor 10 to control the current in a flashlamp 11 from a constant voltage power supply. Switching transistors are commercially available that stand off 600 volts (non-conducting) and carry 200 amperes conducting; one of these is Power Tech MT 1147. The high current switching Darlington device 10 consists of two transistors in which the collectors are tied together and the emitter of the first transistor is directly coupled to the base of the second transistor. Therefore, the emitter current of the first transistor equals the base current of the second transistor. Normally, the device is regarded as having three terminals (C, E, and $B_1$), but in this case the base of the second transistor is brought out and is a fourth terminal ($B_2$). A metal oxide varistor 12 connected between the power terminals prevents the voltage from going too high, and a diode 13 prevents the voltage from going negative.

Flashlamp 11 is a conventional lamp and has, for instance, an approximately four inch arc length. It is filled with a mixture of 10 percent xenon and 90 percent krypton at 2 atmospheres pressure; the gas pressure is fairly high, higher than normal, because it operates more stably and has improved efficiency with high pressure gases. Assuming that the dc voltage is 500 volts and that the switching transistor 10 conducts 200 amperes, the switching circuit can deliver 100 kilowatts or 100 joules per millisecond to the flashlamp for any pulse duration desired. The typical pump pulse requirement for a Q-switched neodymium:yttrium-aluminum-garnet laser 15 is a flashlamp pulse length of 200 microseconds. The transistor circuit can deliver 15 joules to a flashlamp in 200 microseconds. In tests of the circuit that have been conducted with a Nd:YAG laser, two flashlamps have been employed for pumping the laser because of certain thermal characteristics of the Nd-YAG laser. The two flashlamps were driven by separate circuits essentially synchronously but with an adjustable difference to accommodate for the small difference in the flashlamp efficiencies. Such a Nd:YAG laser pumped at 30 joules input to the two flashlamps can provide a Q-switched output beam of 0.25 joules per pulse in the lowest order (TEM$_{00}$) mode. At 300 hertz, this is an average power input of 4.5 kilowatts per flashlamp. For the laser operated in the long pulse mode at 200 kilowatts input to the two flashlamps, the laser output would be approximately 5 joules per millisecond (5 kilowatts). The pulse length can be controlled easily to obtain precisely the required laser energy for an application, such as welding. The output power level of the laser during the pulse can be adjusted to any value less than the 5 joules per millisecond. The average power input to the flashlamp would need to be limited to a tolerable level for the flashlamp by adjusting the repetition frequency.

The dc power supply is comprised of a rectifier, a smoothing inductor, and a capacitor bank; the common terminal is connected to the common terminal of the transistor pulsing circuit. The starting circuit is not shown but delivers a short pulse of high voltage, for instance 15 kilovolts, to break down the flashlamp gas, after which the flashlamp will conduct a low current at a few hundred volts. The efficiency from wall-plug power to the flashlamps can be quite high with this switching transistor method of pulsing a flashlamp. A rectifier system powered by a constant voltage primary power source to a constant voltage dc supply can be made highly efficient. Switching power from the constant voltage dc supply to a flashlamp is also efficient since the voltage drop across the transistor in the "on" condition is approximately one volt. A passive smoothing filter is required to maintain the load current approximately constant in the rectifier system for the rectifier to be efficient.

The transistor control circuit or base drive circuit, indicated generally at 16, has a control section 17 which generates a train of signal level pulses 18. The repetition rate of the pulses is adjustable as is the pulse length. The type MT 1147 switching transistor is a Darlington pair with current gain of 100 at 200 amperes collector current. Thus, the drive gate to the base of the switching transistor must deliver a current of 2 amperes at 2 volts. This gate requirement is well within the capability of conventional pulse circuitry. The train of signal level base drive pulses 18 is fed to a current amplifier powered by 10 volts that has two transistors 19 and 20 whose turn-on and turn-off is controlled by the pulses. The emitter current of the first passes through a small resistor 21 and is the base current of the second transistor, the base and emitter of which are connected through resistors 22 and 23 to ground. The output current is fed to a small resistor 24 and most of it is injected into the base of the first transistor of the Darlington pair and the remainder into the base of the other power transistor. For this purpose, the 10:1 resistance voltage divider 25 is connected between base terminals $B_1$ and $B_2$ and ground.

The modulator circuit 17 with adjustable repetition rate and base drive pulse length provides the desired modulation flexibility. The adjustment of the dc power supply voltage provides the control for the flashlamp peak current. While the switching transistor 10 provides a means for controlling the high pulse power into the flashlamp, a means must be provided for maintaining a small current in the flashlamp between pulses so that the high voltage required to break down and start conduction in the flashlamp will not be required for each pulse. This stand-by discharge current, often referred to as a simmer current, can be provided from the main power with a resistor 14 in parallel with the switching transistor.

For a switching transistor of specified maximum current and stand-off voltage ratings, the power control capability is limited by the power dissipation rating of the transistor. The transistor power dissipation may be classified under two headings: (1) dissipation during current conduction and (2) dissipation during commutation of the load current. These limitations are related to the fraction of the time the transistor may be in conduction and the repetition rate at which the transistor can be switched. In the case of the MT 1147 rated at 600 volts and 200 amperes, the rated average dissipation limit is 1 kilowatt at 100° C. case temperature. The collector dissipation at 200 amperes current is 600 watts and thus not limiting. Further the dissipation due to the forward-biased second breakdown of collector current in the transistor, which may occur during current turn-on, is negligible for a flashlamp load. This is true because the rate of rise of current in the flashlamp is relatively low when voltage is suddenly applied, and the collector-emitter voltage of the transistor at turn-on changes from the high to low with essentially no change in collector current. On the other hand, the dissipation due to reverse-biased second breakdown in the transistor is significant with a flashlamp load and the capacity of the transistor to dissipate energy due to this effect is a limiting factor.

Reverse-biased second breakdown dissipation occurs as the transistor current is turned off because of the high ionization density in the lamp at the high current density. Thus, at turn-off of the transistor, the collector-emitter voltage rises rapidly and the current decreases at a rate determined by the frequency response characteristic of the transistor. Because of the voltage gradients that develop in the transistor base during turn-off, the energy dissipation is concentrated, and this limits the energy that can be dissipated, without damage, during turn-off. This dissipation limit depends on transistor design, and for the MT 1147, the reverse-biased breakdown energy rating is 6 joules. This is relatively high compared to other transistors with similar voltage-current ratings.

In conclusion, an efficient method of pulse pumping an optically pumped laser is achieved by controlling the repetition frequency and length of the conducting intervals of a high current switching transistor which is placed in series with a flashlamp. This controls the current pulses in the flashlamp and consequently the laser pump pulses.

While the invention has been particularly shown and described with reference to a preferred embodiment thereof, it will be understood by those skilled in the art that various changes in form and details may be made therein without departing from the spirit and scope of the invention.

The invention claimed is:

1. In an optically pumped laser having a gaseous discharge flashlamp for pumping the laser and a pulsing circuit that generates flashlamp current pulses, the improvement wherein said pulsing circuit comprises:
   a high current switching transistor in series with said flashlamp and connected to a source of dc voltage;
   a control circuit for generating base drive pulses which render said switching transistor conductive to pulse said flashlamp;
   wherein said switching transistor is a Darlington pair and said control circuit injects currents into the base of both transistors; and
   means in parallel with said switching transistor to provide a path for flashlamp simmer current during nonconducting intervals of said switching transistor.

2. The laser of claim 1 wherein said control circuit generates adjustable pulse length and repetition frequency pulses.

3. The laser of claim 1 wherein said flashlamp is filled with a mixture of krypton and xenon at about 2 atmospheres pressure.

4. In an optically pumped, Q-switched Nd:YAG laser having a gaseous discharge flashlamp for pumping the laser and a pulsing circuit that generates flashlamp current pulses, the improvement wherein said pulsing circuit comprises:
   a high current Darlington switching transistor in series with said flashlamp and connected to a source of constant dc voltage;
   a control circuit for generating adjustable pulse length and repetition frequency base drive pulses which render said switching transistor conductive to pulse said flashlamp; and a resistor in parallel with said switching transistor to provide a path for flashlamp simmer current during nonconducting intervals of said switching transistor.

5. The laser of claim 4 wherein said control circuit comprises means for generating signal level pulses, a current amplifier, and a voltage divider connected to the bases of both transistors of the Darlington device.

* * * * *